US012647725B2

(12) United States Patent
Su et al.

(10) Patent No.: US 12,647,725 B2
(45) Date of Patent: Jun. 2, 2026

(54) COMPUTING DEVICE LOCATION

(71) Applicant: Hewlett-Packard Development Company, L.P., Spring, TX (US)

(72) Inventors: Yu-Hui Su, Taipei City (TW); Chien-Pai Lai, Taipei City (TW); Chung-Chun Chen, Taipei City (TW); Peichen Chuang, Taipei City (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 173 days.

(21) Appl. No.: 18/550,639

(22) PCT Filed: Apr. 13, 2021

(86) PCT No.: PCT/US2021/027011
§ 371 (c)(1),
(2) Date: Sep. 14, 2023

(87) PCT Pub. No.: WO2022/220797
PCT Pub. Date: Oct. 20, 2022

(65) Prior Publication Data
US 2024/0155291 A1 May 9, 2024

(51) Int. Cl.
*H04R 3/00* (2006.01)
*G01S 13/86* (2006.01)
*G01S 15/46* (2006.01)

(52) U.S. Cl.
CPC .............. *H04R 3/005* (2013.01); *G01S 13/86* (2013.01); *G01S 15/46* (2013.01); *H04R 2203/12* (2013.01)

(58) Field of Classification Search
CPC ..... H04R 3/005; H04R 2203/12; G01S 13/86; G01S 15/46
See application file for complete search history.

(56) References Cited

U.S. PATENT DOCUMENTS

2015/0215699 A1* 7/2015 Carlsson .................. H04R 3/02
                                                                           381/71.8
2016/0057532 A1 2/2016 Melanson et al.
2017/0078617 A1* 3/2017 Heda ........................ H04N 7/15
                                  (Continued)

FOREIGN PATENT DOCUMENTS

EP           2138861 A1    12/2009

*Primary Examiner* — Joseph Saunders, Jr.
(74) *Attorney, Agent, or Firm* — Quarles & Brady LLP

(57) ABSTRACT

Example implementations relate to computing device locations and computing devices having audio components thereon that change operational states. In some examples, a non-transitory computer-readable storage medium can include instructions that when executed cause a processor of an electronic device to determine a default host computing device of a plurality of computing devices, request a location of a first computing device of the plurality of computing devices using a sensor of the default host computing device, and request a location of a second computing device of the plurality of computing devices using the sensor. The instructions when executed can cause the processor to determine a first audio loop potential associated with the first computing device and a second audio loop potential associated with the second computing device, assign the first computing device as an active client and assign the second computing device as an inactive client.

16 Claims, 7 Drawing Sheets

(56) References Cited

U.S. PATENT DOCUMENTS

| | | | |
|---|---|---|---|
| 2017/0134588 A1 | 5/2017 | Pappas | |
| 2018/0124128 A1* | 5/2018 | Faulkner | H04L 65/1093 |
| 2018/0132038 A1 | 5/2018 | Dickins et al. | |
| 2019/0166424 A1* | 5/2019 | Harney | G06F 1/1688 |
| 2020/0106877 A1* | 4/2020 | Ledvina | H04W 12/06 |
| 2021/0014676 A1 | 1/2021 | Silverstein et al. | |
| 2021/0099146 A1 | 4/2021 | Lee et al. | |

* cited by examiner

COMPUTING DEVICE LOCATION

BACKGROUND

A conferencing session can include a conference with participants in same or different locations linked by communications devices. For instance, teleconferencing sessions can be linked by telephones, and computing conferencing sessions can be linked by computing devices. A computing device refers to an electronic system having a processing resource, memory resource, and/or an application-specific integrated circuit (ASIC) that can process information. A computing device can include, for example, a laptop computer, a notebook, a desktop, a tablet, and/or a mobile device, among other types of computing devices.

DETAILED DESCRIPTION

Figure 1:
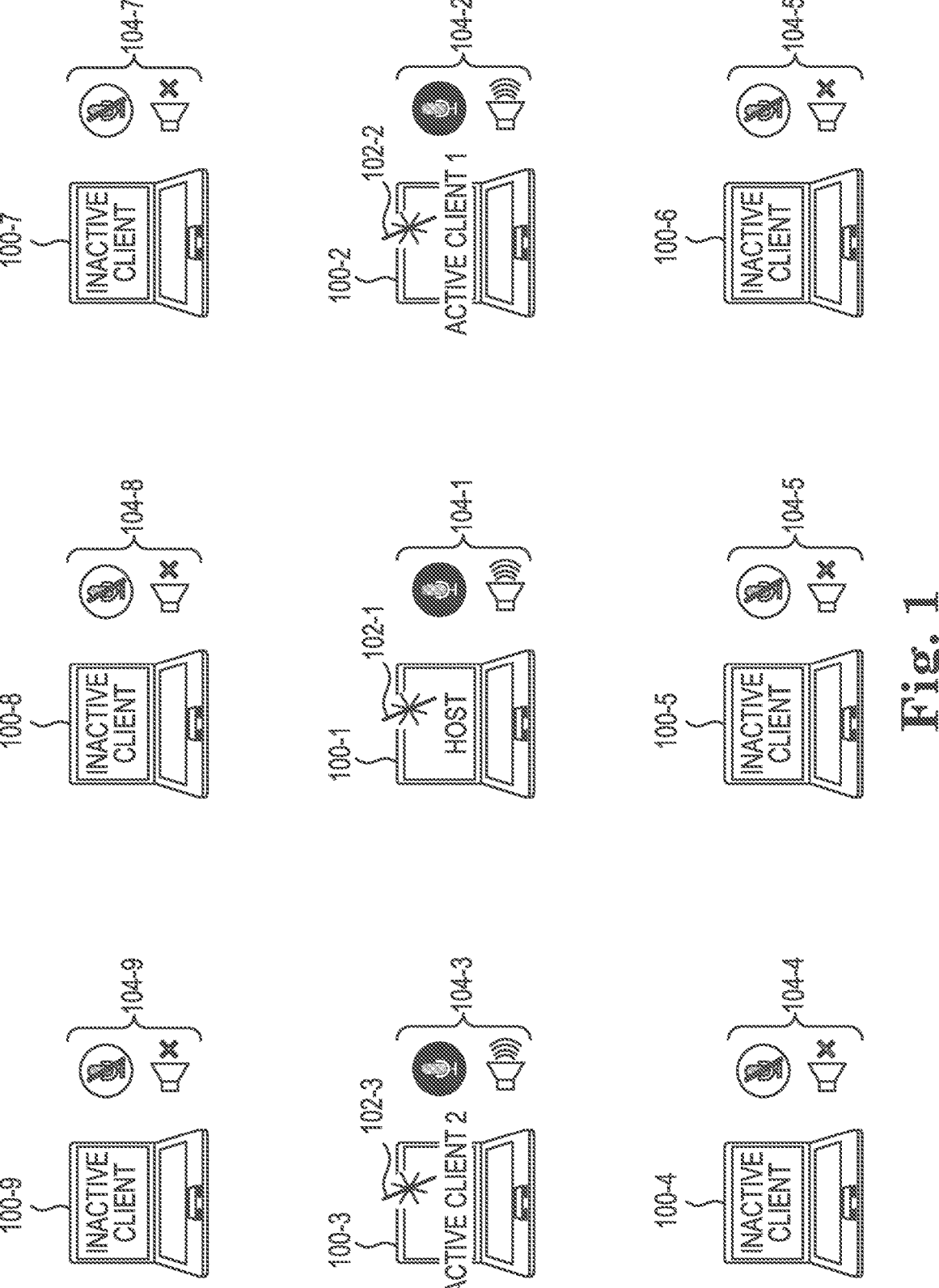
FIG. 1 illustrates an example of a plurality of computing devices having audio components thereon that change states based on location and audio loop potential consistent with the disclosure.

Conferencing sessions can be used within companies, between companies, and for client interactions, among others. Conferencing sessions can include a plurality of locations where participants of the conferencing session are located. For instance, a first participant or set of participants may be in a conference room while a second participating or set of participants of the conferencing session may be in an office at a remote location. The conferencing session may take place via computing devices such as tablets, laptops, or personal computers, among others. In some examples, a conferencing session can include a plurality of different computing devices in at least one location of the conferencing session.

Quality and user experience of conferencing sessions can be impacted by audio issues, including for instance audio loops and resulting howling noises. As used herein, an audio loop can include a sound loop between an audio input (e.g., a microphone) and an audio output (e.g., a speaker). In such an example, a signal received by the audio input is amplified and passed out of the audio output. The sound from the audio output can then be received by the audio input again, amplified further, and passed out through the audio output again. When computing devices are within a particular distance of one another, their respective microphones and speakers can pick up on sound input and output to other computing devices, resulting in additional audio loops and undesirable howling noises.

Some approaches to addressing conferencing session audio issues can include moving computing devices away from one another or muting all but one device in a conference room. However, such approaches neither allow for collaboration as a team in one room together nor allow for multiple collaborators to use their personal computing devices and associated audio components simultaneously in a same room. In addition, audio output from a single computing device may not be able to project sound loud enough for everyone in a room to hear, and a single microphone may not be able to receive sound at levels that would allow for everyone in the room to speak during the conferencing session no matter their location in the room.

In contrast, examples of the present disclosure can expand coverage of computing device audio components such as microphones and speakers in a same room by determining audio loop potentials based on distances between computing devices and use those determinations to enable some computing device audio components while disabling others. Distances between devices can be determined using sensors such as ultra-wideband (UWB) sensors, and in some examples, microphone array beamforming can be used to determine which microphones may contribute to howling.

As used herein, the term "sensor" refers to a device to detect events and/or changes in its environment and transmit the detected events and/or changes for processing and/or analysis. For example, a distance sensor can determine a proximity of an object without physical contact by sending a signal to an object and determining the time it takes for the signal to return and the intensity of a returned signal. Put another way, a distance sensor can sense distance from an object and the sensor through outputting a current, which may be in different forms.

A UWB sensor can use a very low energy level for short-range, high-bandwidth communications over a large portion of the radio spectrum. UWB technology can be used for transmitting information across a wide bandwidth (e.g., >500 MHz). This can allow for the transmission of a large amount of signal energy without interfering with narrow-band and carrier wave transmission in the same frequency band. In some examples, UWB sensors can use time-of-flight models to determine distances between computing devices.

FIG. 1 illustrates an example of a plurality of computing devices 100-1, 100-2, . . . , 100-9 having audio components 104-1, 104-2, . . . , 104-9 thereon that change states based on location and audio loop potential consistent with the disclosure. The audio components 104 can include, for instance, a microphone and a speaker. The plurality of computing devices 100 can be located together in a same room or within a threshold distance of one another, in some instances. Examples are not limited to the number of computing devices 100, active clients 100-2 and 100-3, and/or inactive clients 100-4, 100-5, . . . , 100-9 illustrated in FIG. 1.

A computing device 100-1 can be assigned as a default host when the computing device 100-1 is the host of a communication application conferencing session. A communication application can include, for instance, an application used to facilitate conferencing sessions via voice, video conferencing, or both. A user of the application may download it onto a computing device or visit via a web browser, for instance. Communication applications may be internal to organizations, public, or a combination thereof.

The default host computing device 100-1 can request individual locations of the computing devices within the plurality of computing devices 100 using a sensor. The sensor may send a packet to other computing devices and based on the packet response, locations of the plurality of computing devices 100 can be determined. For instance, using a UWB sensor, the default host computing device 100-1 can determine a time of flight of communication such a packet sent from the default host computing device 100-1 to another computing device of the plurality of computing devices 100. Time of flight, as used herein, includes a measurement of the time taken by an object, particle, or wave to travel a distance through a medium. In some examples, time of flight can be used to determine angles between computing devices within the plurality of computing devices 100.

Based on the determined distances, the default host computing device 100-1 can assign active clients 100-2 and 100-3 and inactive clients 100-4, 100-5, . . . , 100-9. The active clients 100-2 and 100-3 can be determined to be outside of a howling range and instructed to enable their respective audio components 104-2 and 104-3 (e.g., microphone and speaker), while the inactive clients 100-4, 100-5, . . . , 100-9 can be determined to be inside of a howling range (e.g., a higher audio loop potential) and can be instructed to disable their respective audio components 104-4, 104-5, . . . , 104-9 (e.g., microphone and speaker). For instance, computing devices within the plurality of computing devices 100 that are within audio loop range of one another may have too high of an audio loop potential to both be active clients. One or both may be assigned as inactive clients.

The active clients 100-2 and 100-3 can receive sound via beamforming as illustrated at 102-1, 102-2, and 102-3. Beamforming, as used herein, focuses a signal (e.g. a wireless signal) towards a particular receiving device rather than having the signal spread in multiple directions from an antenna. This can allow for a more direct connection that is faster and more reliable than a signal sent without beamforming. In the illustrated example, the active clients 100-2 and 100-3, as well as the default host computing device 100-1 can receive sound via beamforming 102 to improve sound quality of the conferencing session and reduce audio loop risks because of the directed signaling. Sound that is outside of the directed signaling can be treated as noise and not received by a speaker, for instance, improving sound quality.

In the example illustrated in FIG. 1, the computing devices 100-1, 100-2, and 100-3 include the beamforming 102 capabilities. In such an example, the beamforming 102 is fixed, so it is kept among the middle computing devices 100 to reduce interference. For instance, beamforming 102 can occur with the computing devices 100-7, 100-8, and 100-9 and/or to the computing devices 100-4, 100-5, and 100-6 without interference. Audio components 104 at other computing devices 100-4, 100-5, . . . , 100-9 can receive sound via beamforming 102 even though beamforming antennas and/or other capabilities are found at computing devices 100-1, 100-2, and 100-3.

Figure 2:
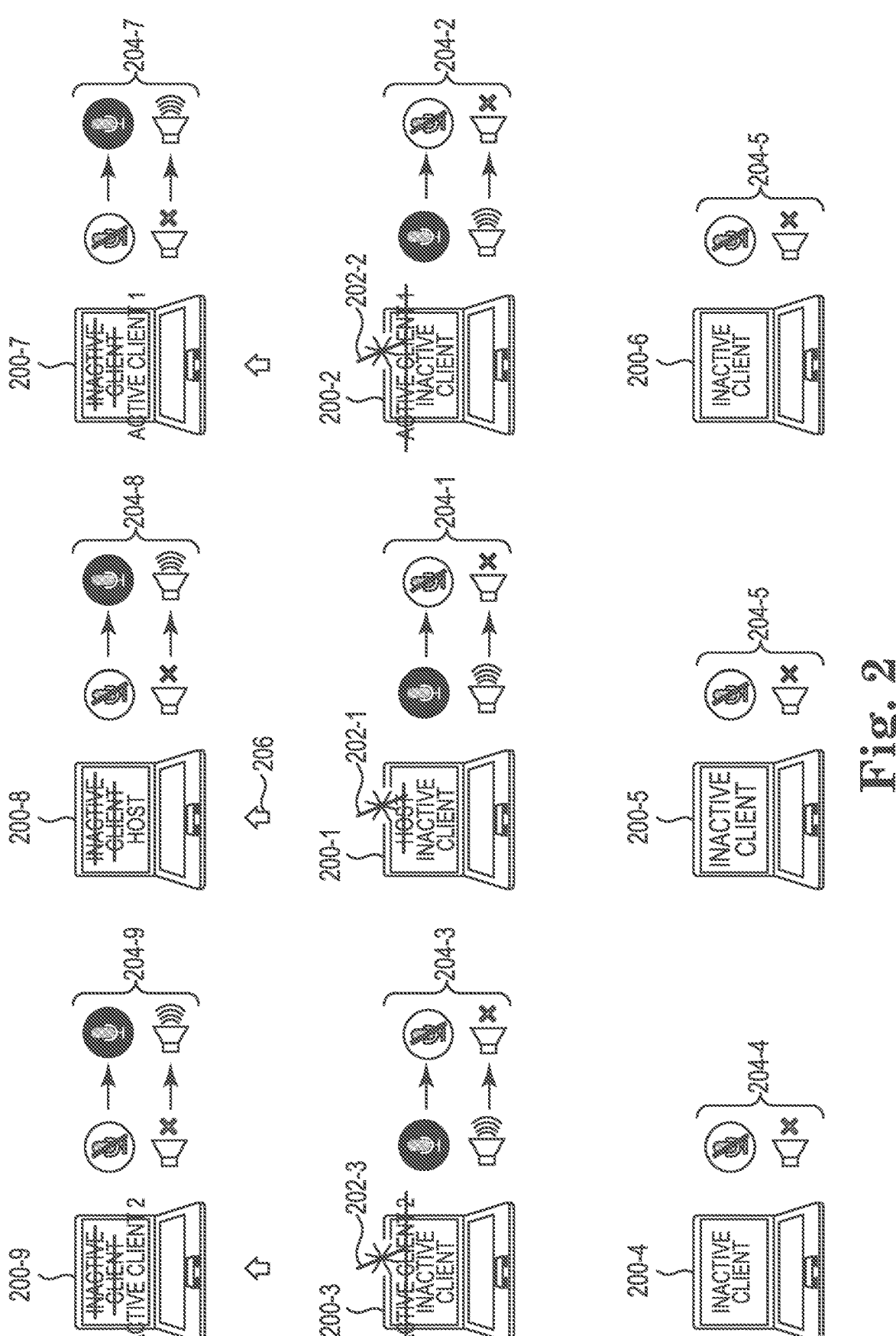
FIG. 2 illustrates another example of a plurality of computing devices having audio components thereon that change states based on location and audio loop potential consistent with the disclosure.

FIG. 2 illustrates another example of a plurality of computing devices 200-1, 200-2, . . . , 200-9 having audio components 204-1, 204-2, . . . , 204-9 thereon that change states based on location and audio loop potential consistent with the disclosure. Examples are not so limited to the particular numbers of computing devices 200, active clients 200-7 and 200-9, and/or inactive clients 200-1, 200-2, . . . , 200-6 illustrated in FIG. 2.

FIG. 2 illustrates a change of a host computing device from original default computing device 200-1 to original inactive client 200-8. For instance, the computing device 200-8, which was an inactive client, enables audio components 204-8. By doing so, the computing device 200-8 takes over host computing device duties from computing device 200-1, which was the default host computing device. Computing device 200-1 transfers the status, for instance at 206, to the computing device 200-8. The enablement of the audio components 204-8 can occur via hardware (e.g., unmuting a microphone via a computing device keyboard) or via executable instructions (e.g., unmuting a microphone via a mobile application).

For instance, if a microphone is enabled via hardware, a packet can be sent to a controller (e.g., an embedded controller), which can in turn send the packet to an audio codec, which can subsequently send the packet to an audio driver. The audio driver can send the packet to an operating system daemon to trigger a sensor of the computing device 200-8 to determine locations of remaining computing devices of the plurality of computing devices 200. The computing device 200-8 can also, in some instances, send a disablement instruction to the original active clients 200-2 and 200-3 and the previous default host computing device 200-1 to disable their respective audio components 204.

If a microphone is enabled via executable instructions at the computing device 200-8, an application of the computing device 200-8 can be alerted and the audio components 204-8 can be enabled. The application can also initiate requests for locations of other computing devices of the plurality of computing devices 200 via a sensor and send audio component disablement instructions to original active clients 200-2 and 200-3 and original default host device 200-1.

Wien locations of the plurality of computing devices 200 are determined using the sensor (e.g., a UWB sensor) of computing device 200-8, active client and inactive client assignments can be made based on audio loop potentials determined using the determined locations and/or any determined positions (e.g., angles) of the plurality of computing devices 200. Sound can be received at the new active clients 200-8 and 200-9 via beamforming 202-1, 202-2, and 202-3 facilitated at the computing devices 200-1, 200-2, and 200-3. The process can repeat, for instance, if another computing device of the plurality of computing devices 200 enables its audio components 204.

Figure 3:
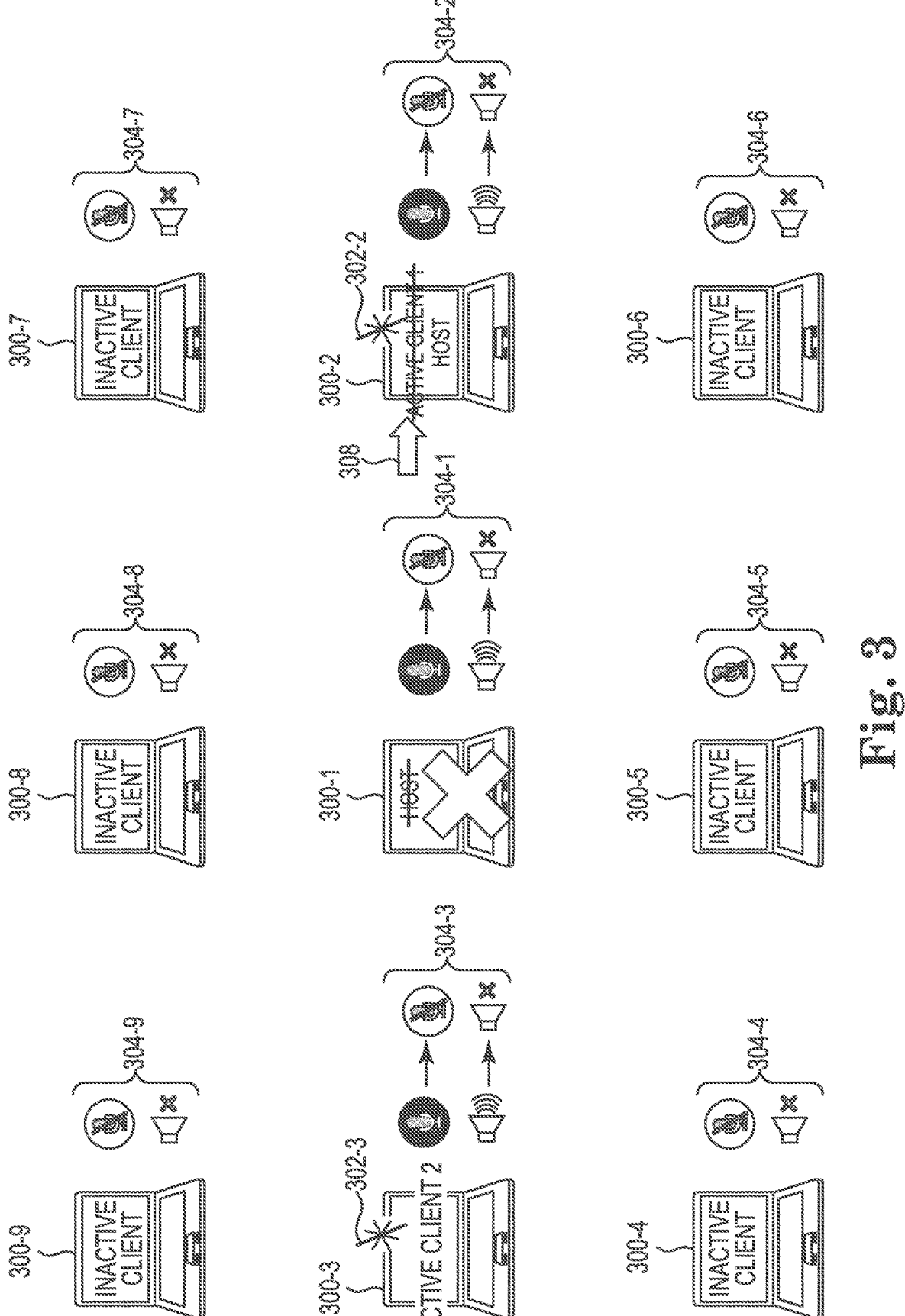
FIG. 3 illustrates yet another example of a plurality of computing devices having audio components thereon that change states based on location and audio loop potential consistent with the disclosure.

FIG. 3 illustrates yet another example of a plurality of computing devices 300-1, 300-2, . . . , 300-9 having audio components 304-1, 304-2, . . . , 304-9 thereon that change states based on location and audio loop potential consistent with the disclosure. Examples are not so limited to the particular numbers of computing devices 300, active client 300-3, and/or inactive clients 300-4, 300-5, . . . , 300-9 illustrated in FIG. 3, FIG. 3 illustrates a default host computing device 300-1 leaving a conferencing session. For instance, the default host computing device 300-1 may leave a communication application conferencing session while the other participants (e.g., the remaining plurality of computing devices 300) remain. In such an example, host duties are transferred, for instance at 308, to a first active client 300-2. An operating system daemon of the new host computing device 300-2 can trigger a request for locations of the remaining computing devices of the plurality of computing devices 300 via a sensor (e.g., a UWB sensor) of the computing device 300-2, and audio component disablement instructions can be transmitted to previous active client 300-3. By leaving the conferencing session, the computing device 300-1 disables its audio components 304-1.

Based on the determined location results, new active client and inactive client assignments can be made. Active client assignments, for instance, can allow for enablement of audio components 304 and beamforming of sound (e.g., via beamforming arrays 302-2 and 302-3), whereas inactive client assignments can include audio component disablement instructions. The process may be repeated if another computing device of the plurality of computing devices 300 leaves the conferencing session.

Figure 4:
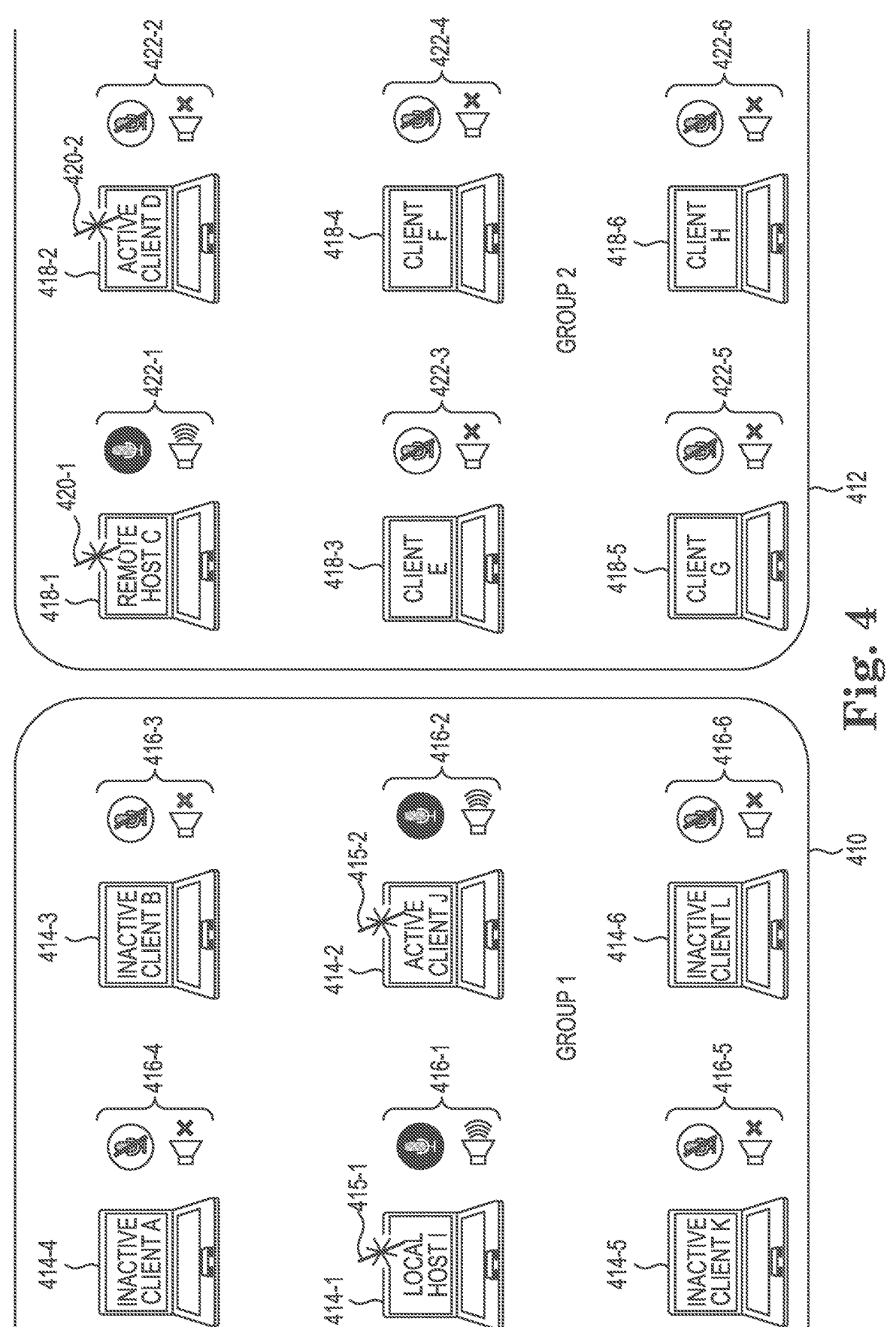
FIG. 4 illustrates an example of groups of computing devices in different locations having audio components thereon that change states based on location and audio loop potential consistent with the disclosure.

FIG. 4 illustrates an example of groups 410 and 412 of computing devices 414-1, 414-2, . . . , 414-6 and 418-1, 418-2, . . . , 418-6 in different locations having audio components 416-1, 416-2, . . . , 416-6 and 422-1, 422-2, . . . , 422-6 thereon that change states based on location and audio loop potential consistent with the disclosure. Examples are not so limited to the particular numbers and assignments of computing devices 414 and 418 within Group 1 410 and Group 2 412 illustrated in FIG. 4.

FIG. 4 illustrates two groups, Group 1 410 of computing devices 414 and Group 2 412 of computing devices 418. Group 1 410 is located in a different location than Group 2 412. The computing devices 414 are located within a same room as one another or within a threshold distance of one another. The computing devices 418 are location within a same room of one another or within a threshold distance of one another, but in a different location than the computing devices 414. For instance, Group 1 410 may be located in Country A, while Group 2 412 may be located in Country B. While two groups of computing devices are illustrated in FIG. 4, examples are not so limited. More than two groups may be part of the conferencing session.

In the example illustrated in FIG. 4, two different groups 410, 412 of computing devices 414, 418 are participating in a conferencing session. A host of a communication application can be the default host computing device 414-1 and a local host for Group 1 410. The default host computing device 414-1 can trigger a sensor to request locations of the remaining computing devices 414 of Group 1 410, for instance using a UWB sensor. The default host computing device 414-1 can also receive a client list and use the client list to determine which computing devices 414 are in Group 1 410, and which computing devices 418 are located outside of Group 1 410. For instance, the default host computing device 414-1 can compare the client list to computing devices 414 located using the sensor to determine computing devices 418 are not located in Group 1 410.

The default host computing device 414-1 can make active client assignments (e.g., active client J 414-2) and inactive client assignments (e.g., inactive clients A, B, K, L 414-4, 414-3, 414-5, 414-6) based on determined locations of the computing devices 414 and audio loop potentials. Enablement and disablement instructions can be transmitted to the associated audio components 416. The default host computing device 414-1 and the active client J 415-2 can receive sound via beamforming, for instance at 415-1 and 415, 2, respectively.

Based on the comparison of the client list to the computing devices 414 and 418, the default host computing device 414-1 can assign remote hosting duties to a computing device within Group 2 412. For instance, the remote host C device within Group 2 412. For instance, the remote host C

418-1 can take on remote hosting duties and activate a sensor scan to request locations of the computing devices 418 in Group 2 412. The remote host C 418-1 can make active client assignments (e.g., active client D 418-2) and inactive client assignments (e.g., inactive clients E, F, G, H 418-3, 418-4, 418-5, 418-6) based on determined locations of the computing devices 418 and audio loop potentials. Enablement and disablement instructions can be transmitted to the associated audio components 422. The remote host C 418-1 and the active client D 418-2 can receive sound via beamforming, for instance at 420-1 and 420, 2, respectively.

Figure 5:
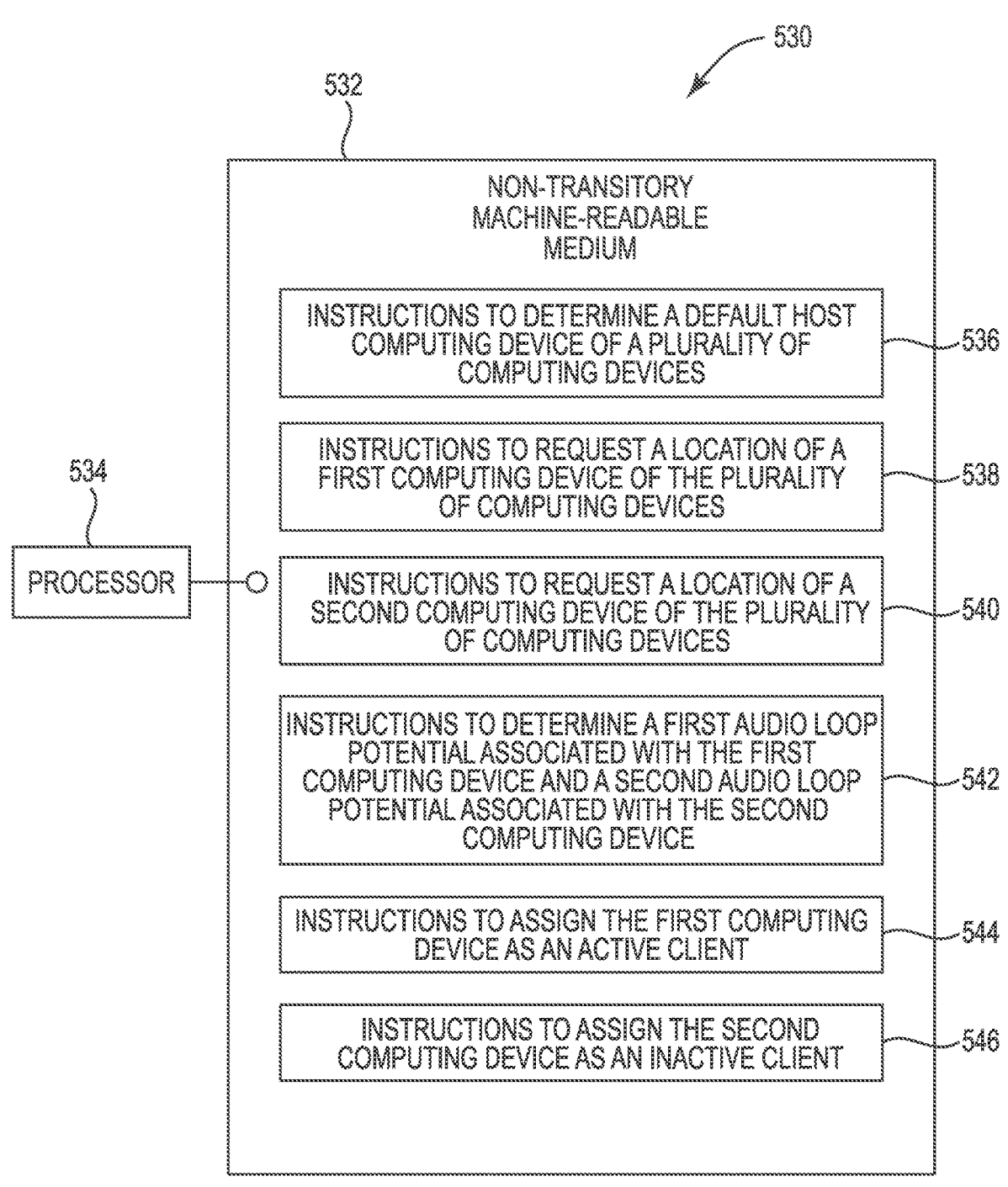
FIG. 5 illustrates an example system including a processor and a non-transitory machine-readable medium for changing states of audio components based on location and audio loop potential consistent with the disclosure.

FIG. 5 illustrates an example system 530 including a processor 534 and a non-transitory machine-readable medium 532 having instructions 536, 538, 540, 542, 544, and 546 thereon for changing states of audio components based on location and audio loop potential consistent with the disclosure.

System 530 can be a computing device in some examples. For example, system 530 can include a processor 534. System 530 can further include a non-transitory machine readable medium 532, on which may be stored instructions, such as instructions 536, 538, 540, 542, 544, and 546. Although the following descriptions refer to a processor and a memory, the descriptions may also apply to a system with multiple processors and multiple memories. In such examples, the instructions may be distributed (e.g., stored) across multiple non-transitory machine-readable mediums and the instructions may be distributed (e.g., executed by) across multiple processors.

The processor 534 can be a central processing unit (CPU), a semiconductor-based microprocessor, and/or other hardware devices suitable for retrieval and execution of instructions stored in the non-transitory machine readable medium 532. Processor 534 can fetch, decode, and execute instructions 536, 538, 540, 542, 544, 546, or a combination thereof. As an alternative or in addition to retrieving and executing instructions, processor 534 can include at least one electronic circuit that includes electronic components for performing the functionality of instructions 536, 538, 540, 542, 544, 546, or a combination thereof.

The non-transitory machine readable medium 532 may be electronic, magnetic, optical, or other physical storage device that stores executable instructions. Thus, the non-transitory machine readable medium 532 may be, for example, Random Access Memory (RAM), an Electrically-Erasable Programmable Read-Only Memory (EEPROM), a storage drive, an optical disc, and the like on-transitory machine readable medium 532 may be disposed within system 530, as shown in FIG. 3. In this example, the executable instructions 536, 538, 540, 542, 544, and 546 may be "installed" on the device. Additionally and/or alternatively, non-transitory machine readable medium 532 can be a portable, external or remote storage medium, for example, that allows system 530 to download the instructions 536, 538, 540, 542, 544, and 546 from the portable/external/remote storage medium. In this situation, the executable instructions may be part of an "installation package". As described herein, the non-transitory machine readable medium 532 can be encoded with executable instructions for making audio component operation state changes.

Instructions 536, when executed by a processor such as processor 534, can include instructions to determine a default host computing device of a plurality of computing devices. The plurality of computing devices, for instance, can be located within a same room and/or within a threshold distance of one another. A default host computing device may be the computing device that hosts a conferencing session via a communication application. In some instances, the default host computing device may be the computing device that is first to join the conferencing session via the communication applications.

Instructions 538, when executed by a processor such as processor 534, can include instructions to request a location of a first computing device of the plurality of computing devices relative to a location of the default host computing device and relative to a location of a second computing device of the plurality of computing devices using a sensor of the default host computing device, and instructions 540, when executed by a processor such as processor 534, can include instructions to request a location of the second computing device relative to the location of the default host computing device and relative to the location of the first computing device using the sensor. The sensor, in some examples, can include a UWB sensor.

In some examples, a time of flight of communication between the default host computing device and the first computing device and a time of flight of communication between the default host computing device and the second computing device can be determined. For instance, the sensor can measure the time taken by a packet to travel from the default host computing device to the first computing device and back. Similarly, the sensor can measure the time taken by a packet to travel from the default host computing device to the second computing device and back. By doing so, the sensor can be used to determine locations and positions (e.g., angles) of other computing devices within the plurality of computing devices.

Instructions 542, when executed by a processor such as processor 534, can include instructions to determine a first audio loop potential associated with the first computing device and a second audio loop potential associated with the second computing device based on the location of the default host computing device, the location of the first computing device, and the location of the second computing device. An audio loop potential, as used herein can include the likelihood that two computing devices will result in an undesired audio loop. An audio loop potential can be determined based on a location and/or a position of one computing device relative to another computing device.

Instructions 544, when executed by a processor such as processor 534, can include instructions to assign the first computing device as an active client based on the first audio loop potential and the second audio loop potential, wherein the active client assignment is to instruct the first computing device to receive sound via a microphone (e.g., via beamforming) to the first computing device and play sounds via a speaker of the first computing device.

Instructions 546, when executed by a processor such as processor 534, can include instructions to assign the second computing device as an inactive client based on the first audio loop potential and the second audio loop potential, wherein the inactive client assignment is to instruct the second computing device to disable a microphone and a speaker of the second computing device. For instance, if the first audio loop potential is lower than the second audio loop potential, the first computing device may be more likely to be outside a howling range than the second computing device. Because of this, the first computing device can be assigned an active client status, while the second computing device is assigned an inactive client status.

In some examples, the first computing device is assigned as a new default host computing device responsive to the default host computing device ending a communication with the plurality of computing devices. For instance, if the default computing device leaves a conferencing session (e.g., "leave meeting" in communication application), the first computing device, also known as the new default host computing device can take over hosting duties.

In such an example, a location of remaining computing devices of the plurality of computing devices can be requested, and the new default host computing device can be changed to a new host computing device of the plurality of computing devices based on a determined third audio loop potential associated with the new host computing device and based on the location of the default host computing device, the location of the new host computing device, the location of the first computing device, the location of the second computing device, and the location of the remaining computing devices of the plurality of computing devices. For example, the new default host computing device may be determined to be the best candidate for the host computing device duties or may assign the host computing device duties to another computing device.

Figure 6:
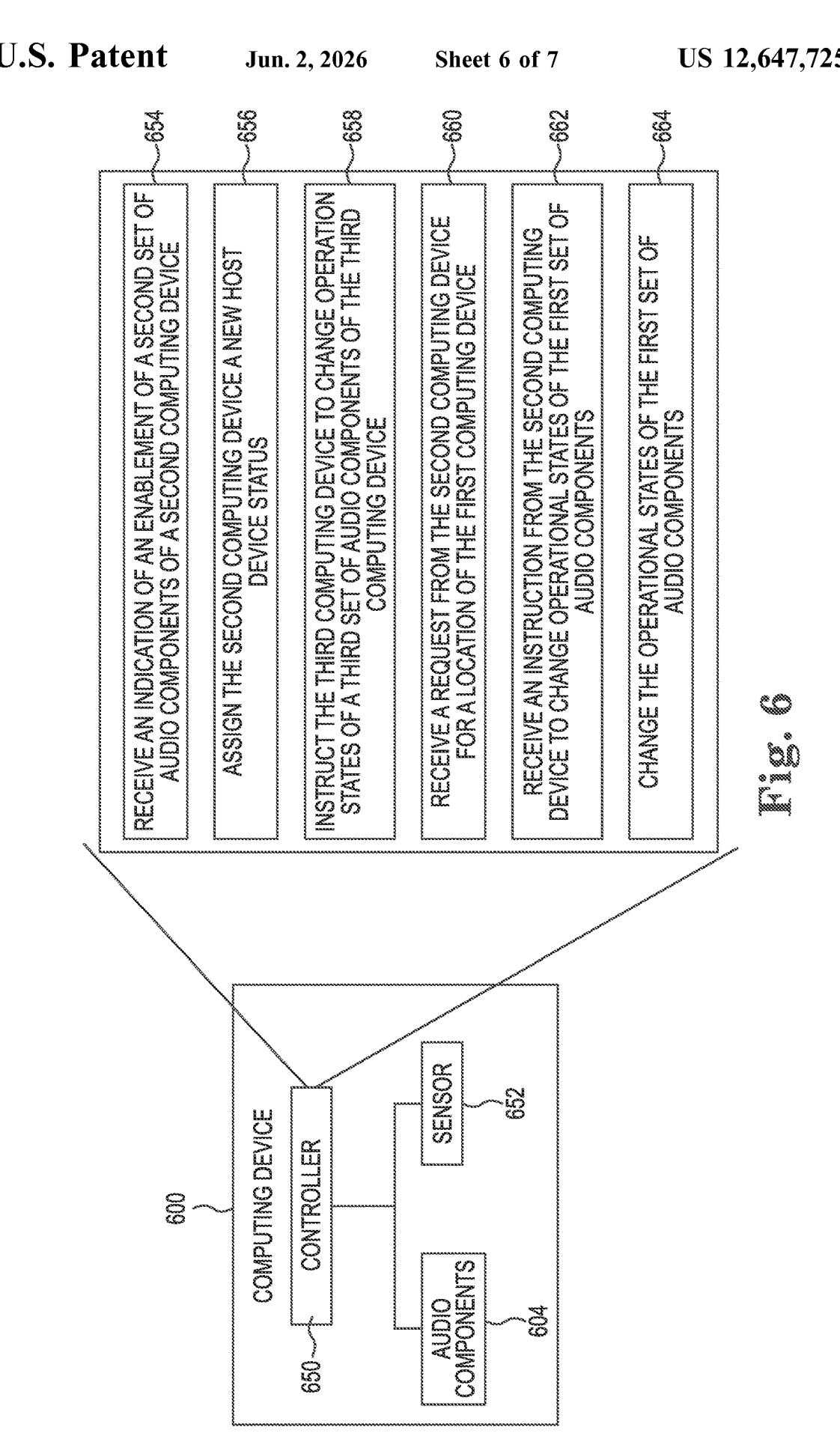
FIG. 6 illustrates an example of a computing device including a controller, a sensor, and audio components thereon that change states based on location and audio loop potential consistent with the disclosure.

FIG. 6 illustrates an example of a computing device 600 (referred to herein as a first computing device 600) including a controller 650, a sensor 652, and audio components 604 (referred to herein as a first set of audio components 604) thereon that change states based on location and audio loop potential consistent with the disclosure. For ease of explanation, the controller 650 is referred to as a single physical controller, but examples are not so limited. The controller 650 can include hardware, such as a processor and is communicatively coupled to the sensor 652 and the audio components 604. As used herein, "communicatively coupled" can include coupled via various wired and/or wireless connections between devices such that data can be transferred in various directions between the devices. The coupling need not be a direct connection, and in some examples can be an indirect connection. The audio components 604 can include a microphone and/or a speaker, among other audio components. In some examples, the audio components 604 are analogous to audio components 104, 204, 304, 416, 422, and/or 770 and 772, as described herein.

The controller 650, at 654, can receive an indication of an enablement of a second set of audio components of a second computing device, wherein the second computing device is in a same room as the first computing device 600 and a third computing device. For instance, the second computing device may enable (e.g., "unmute") a previously disabled microphone and enable a previously disabled speaker while in a conferencing session with the first computing device 600 and the third computing device.

At 656, the controller 650 can assign the second computing device a new host device status in response to the indication of the enablement, and at 658, the controller 650 can instruct the third computing device to change operation states of a third set of audio components of the third computing device based on locations of the second computing device and the third computing devices and audio loop potentials of the second computing device and the third computing device. The operation state change can include, for instance, enabling previously disabled audio components, disabling previously enabled audio components, or confirming instructions to keep audio components at a current operational state.

At 660, the controller 650 can receive a request from the second computing device for a location of the first computing device 600 relative to the location of the second computing device and the third computing device via the sensor 652, and at 662, the controller 650 can receive an instruction from the second computing device to change operational states of the first set of audio components 604 based on the requested location. For instance, the second computing device can make active client assignments and inactive client assignments to the first computing device 600 and the third computing devices, resulting in instructions to either enable audio components (e.g., active client status) or disable audio components (e.g., inactive client status).

The controller 650, at 664 can change the operational states of the first set of audio components 604 based on the instruction. For example, the controller 650 can change the operational states of the first set of audio components 604 to disabled states responsive to the instruction received from the second computing device instructing disablement of the first set of audio components 604. Similarly, the controller 650 can change the operational states of the first set of audio components 604 to enabled states responsive to the instruction received from the second computing device instructing enablement of the first set of audio components 604. In such an example, the controller 650 can instruct the first computing device 600 to receive sound via beamforming at a microphone of the first set of audio components 604 and to play sounds via a speaker of the first set of audio components 604.

Figure 7:
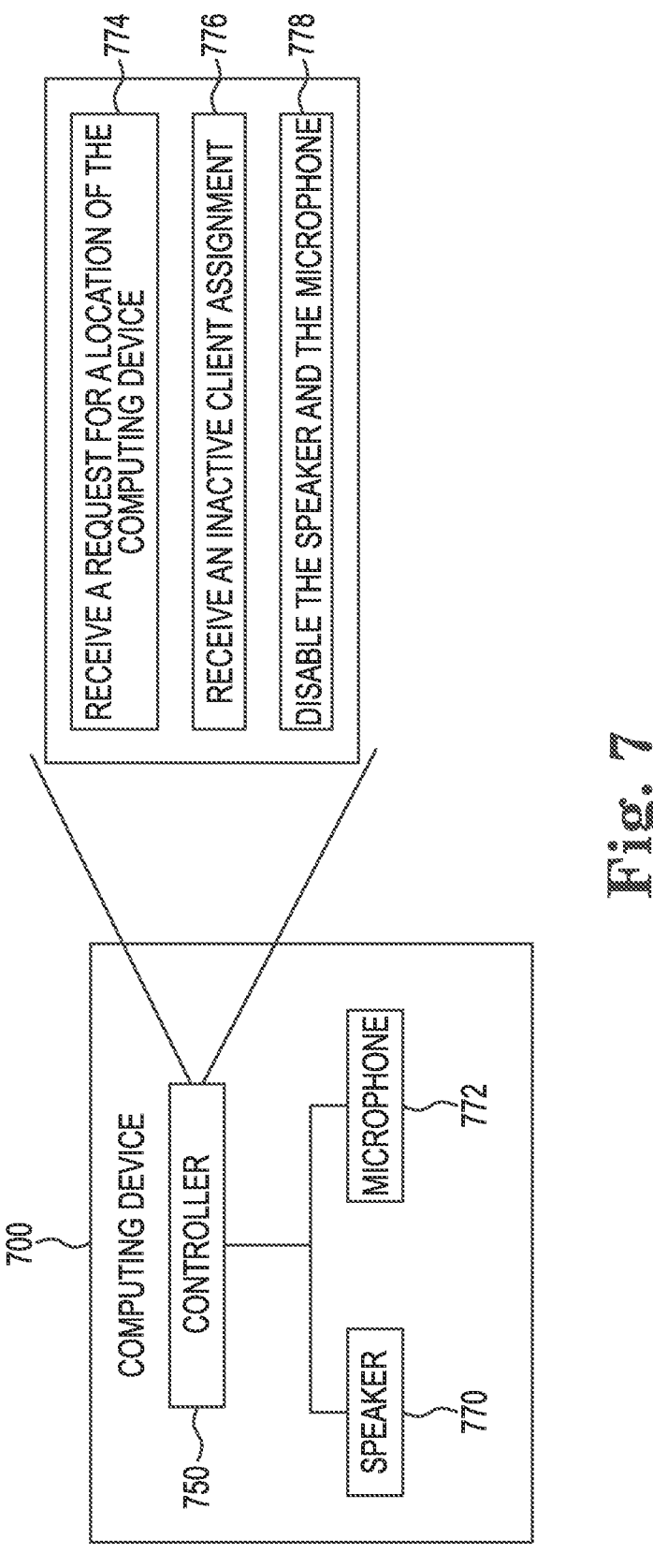
FIG. 7 illustrates an example of a computing device including a controller, a speaker, and a microphone thereon that change states based on location and audio loop potential consistent with the disclosure.

The controller 650, in some examples can instruct a fourth computing device in a different room than the first computing device 600, the second computing device, and the third computing device to determine a location of a fifth computing device in the different room relative to the fourth computing device using a sensor of the fourth computing device. For instance, if the controller 650 determines using a client list and a sensor that the fourth computing device and the fifth computing device are in the different room, the fourth computing device can be assigned a remote host role. The fourth computing device can determine a location of the fifth computing device and assign an active or an inactive client role based on the determined location and an associated audio loop potential, FIG. 7 illustrates an example of a computing device 700 including a controller 750, a speaker 770, and a microphone 772 thereon that change states based on location and audio loop potential consistent with the disclosure. For ease of explanation, the controller 750 is referred to as a single physical controller, but examples are not so limited. The controller 750 can include hardware, such as a processor and is communicatively coupled to the speaker 770 and the microphone 772. The speaker 770 and the microphone in some examples, are analogous to audio components 104, 204, 304, 416, 422, and/or 604, as described herein.

The controller 750 can receive a request for a location of the computing device 700 relative to a host computing device via a sensor of the host computing device at 774. In some examples, the computing device 700 and the host computing device are located in a same room with a plurality of other computing devices. The controller 750, at 776, can receive an inactive client assignment from the host computing device, and at 778, the controller 750 can disable the speaker 770 and the microphone 772 in response to the inactive client assignment. For instance, the host computing device may determine the computing device 700 is within a howling range and instruct disablement of the speaker 770 and the microphone 772 to improve a conferencing session in which the host computing device and the computing device 700 are participating.

In some examples, the controller 750 can enable the speaker 770 and the microphone 772 and receive a new host assignment from the host computing device. In such an example, upon enablement of the speaker 770 and the microphone 720, the computing device 700 takes over hosting duties from the host computing device. In such examples, the speaker 770 can play sounds in response to the enablement of the speaker 770, and the microphone can receive sound via beamforming in response to the enablement of the microphone 772.

In response to the new host assignment, the controller 750 can instruct the host computing device to disable its audio components and request a location of the host device and the other plurality of computing devices via sensor of the computing device 700. The controller 750 can determine audio loop potentials based on the determined locations and make active and inactive client assignments based on the determined locations and the determined audio loop potentials.

In the foregoing detailed description of the disclosure, reference is made to the accompanying drawings that form a part hereof, and in which is shown by way of illustration how examples of the disclosure may be practiced. These examples are described in detail to enable those of ordinary skill in the art to practice the examples of this disclosure, and it is to be understood that other examples may be utilized and that process, electrical, and/or structural changes may be made without departing from the scope of the disclosure.

The figures herein follow a numbering convention in which the first digit corresponds to the drawing figure number and the remaining digits identify an element or component in the drawing. Similar elements or components between different figures may be identified by the use of similar digits. For example, 100 may reference element "00" in FIG. 1, and a similar element may be referenced as 300 in FIG. 3. Analogous elements within a Figure may be referenced with a hyphen and extra numeral or letter. See, for example, elements 202-1, 202-2, and 202-3 in FIG. 2. Such analogous elements may be generally referenced without the hyphen and extra numeral or letter. For example, elements 202-1, 202-2, and 202-3 may be collectively referenced as 202.

Elements illustrated in the various figures herein can be added, exchanged, and/or eliminated so as to provide a plurality of additional examples of the disclosure. In addition, the proportion and the relative scale of the elements provided in the figures are intended to illustrate the examples of the disclosure and should not be taken in a limiting sense. As used herein, "a plurality of" an element and/or feature can refer to more than one of such elements and/or features.

What is claimed is:

1. A non-transitory computer-readable storage medium comprising instructions that when executed cause a processor of a host computing device to:

send, via a sensor of the host computing device, a packet to be received by a plurality of computing devices, wherein the plurality of computing devices includes a first computing device and a second computing device;

enable a microphone of the host computing device, wherein enabling the microphone includes: receiving a further packet to enable the microphone and sending the further packet to an audio codec;

take over a plurality of host duties previously assigned to a default host computing device in response to the microphone being enabled;

cause an audio driver of the host computing device to:
receive the further packet from the audio codec and send the further packet to an operating system daemon to trigger the sensor to determine a location of the plurality of computing devices;

determine a first location of the first computing device relative to a location of the host computing device and relative to a location of the second computing device based on a first packet response from the first computing device received by the host computing device;

determine a second location of the second computing device relative to the location of the host computing device and relative to the first location of the first computing device based on a second packet response from the second computing device received by the host computing device;

determine a first audio loop potential associated with the first computing device and a second audio loop potential associated with the second computing device based on the location of the host computing device, the first location of the first computing device, and the location of the second computing device; and based on the first audio loop potential and the second audio loop potential:

assign the first computing device an active client assignment, wherein the active client assignment is to instruct the first computing device to receive sound via a first microphone to the first computing device and play sounds via a speaker of the first computing device; and assign the second computing device an inactive client assignment, wherein the inactive client assignment is to instruct the second computing device to disable a second microphone and a speaker of the second computing device.

2. The medium of claim 1, wherein the instructions when executed further cause the processor to assign the first computing device as a new default host computing device responsive to the default host computing device ending a communication with the plurality of computing devices.

3. The medium of claim 2, wherein the instructions when executed further cause the processor to:

request, using the sensor, locations of remaining computing devices of the plurality of computing devices; and change the new default host computing device to a new host computing device of the plurality of computing devices based on a determined third audio loop potential associated with the new host computing device and based on the location of the default host computing device, a location of the new host computing device, the location of the first computing device, the location of the second computing device, and the locations of the remaining computing devices.

4. The medium of claim 1, wherein the plurality of computing devices is located within a same room.

5. The medium of claim 1, wherein the instructions when executed further cause the processor to:

determine a time of flight of communication between the default host computing device and the first computing device; and determine a time of flight of communication between the default host computing device and the second computing device.

6. The medium of claim 1, wherein the sensor is an ultra-wideband (UWB) sensor.

7. The medium of claim 1, wherein the active client assignment is to instruct the first computing device to receive sound via the first microphone using beamforming.

8. The medium of claim 1, wherein
the first location of the first computing device is further determined based on a first time of flight associated with the first packet response, and
the second location of the second computing device is further determined based on a second time of flight associated with the second packet response.

9. A first computing device, comprising:
a first sensor;
a first set of audio components; and
a controller, to:
detect that a host computing device has left a conference session;
send a packet to enable a second set of audio components of a second computing device, wherein an audio driver of the second computing device receives the packet from an audio codec of the second computing device and sends the packet to an operating system daemon to trigger a second sensor of the second computing device to determine locations of the first computing device and a third computing device;
receive an indication of an enablement of the second set of audio components of the second computing device, wherein the second computing device is in a same room as the first computing device and the third computing device and wherein the second set of audio components includes a microphone;
transfer a plurality of host duties previously assigned to the host computing device to the second computing device in response to detecting the host computing device has left the conference session and the indication of the enablement;
instruct the third computing device to change operational states of a third set of audio components of the third computing device based on locations of the second computing device and the third computing device and audio loop potentials of the second computing device and the third computing device;
receive a request from the second computing device for a first location of the first computing device relative to a second location of the second computing device and a third location of the third computing device via the second sensor;
receive an instruction from the second computing device to change operational states of the first set of audio components based on the first location; and
change operational states of the first set of audio components based on the instruction.

10. The first computing device of claim 9, further comprising
the controller to change operational states of the first set of audio components to enabled states responsive to the instruction received from the second computing device instructing enablement of the first set of audio components.

11. The first computing device of claim 10, further comprising
the controller to instruct the first computing device to receive sound via beamforming at a microphone of the first set of audio components and to play sounds via a speaker of the first set of audio components.

12. The first computing device of claim 9, further comprising
the controller to change operational states of the first set of audio components to disabled states responsive to the instruction received from the second computing device instructing disablement of the first set of audio components.

13. The first computing device of claim 9, further comprising the controller to instruct a fourth computing device in a different room than the first, the second, and the third computing devices to determine a location of a fifth computing device in the different room relative to the fourth computing device using a third sensor of the fourth computing device.

14. A computing device, comprising:

a speaker;

a microphone; and a controller, to:

receive, from a first sensor of a host computing device, a packet for determining a location of the computing device relative to the host computing device;

send a packet response to the host computing device, wherein the computing device and the host computing device are located in a same room with a plurality of other computing devices;

receive an inactive client assignment from the host computing device;

in response to the inactive client assignment, disable the speaker and the microphone;

enable the microphone, wherein enabling the microphone includes: receiving a further packet to enable the microphone and sending the further packet to an audio codec; and take over a plurality of host duties previously assigned to the host computing device in response to the microphone being enabled; and wherein an audio driver of the computing device is to:

receive the further packet from the audio codec; and send the further packet to an operating system daemon to trigger a second sensor to determine a location of the plurality of other computing devices.

15. The computing device of claim 14, wherein the controller is further to:

enable the speaker;

receive a new host assignment from the host computing device; and in response to the new host assignment, request a location of the host computing device and the location of the plurality of other computing devices via the second sensor of the computing device.

16. The computing device of claim 15, further comprising:

the speaker to play sounds in response to enabling the speaker; and the microphone to receive sound via beamforming in response to enabling of the microphone.

* * * * *